United States Patent Office 3,338,814
Patented Aug. 29, 1967

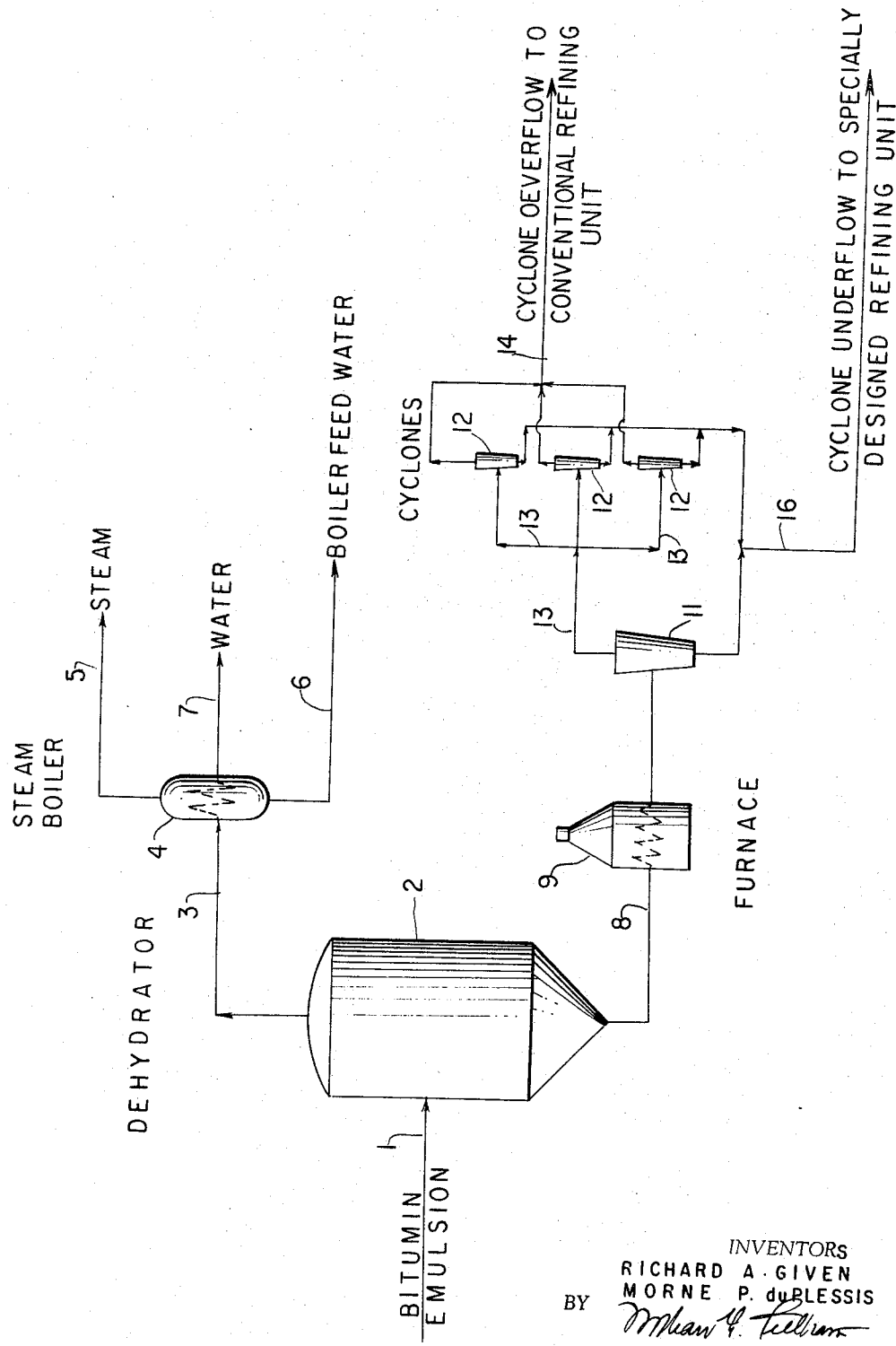

3,338,814
PROCESS FOR SEPARATING OIL FROM BITUMINOUS SAND
Richard A. Given and Morne P. du Plessis, Edmonton, Alberta, Canada, assignors, by mesne assignments, of thirty percent to Imperial Oil Limited, a corporation of Canada, thirty percent to Atlantic Richfield Company, a corporation of Pennsylvania, and ten percent to Royalite Oil Company Limited, a corporation of Canada
Filed May 8, 1964, Ser. No. 365,918
2 Claims. (Cl. 208—11)

This invention relates to the separation of oil from bituminous emulsions containing appreciable quantities of mineral solids. More particularly, this invention relates to a method for separating and upgrading oil from a bituminous emulsion obtained by admixing water with bituminous sand in order to recover the bitumen. Broadly, the separation of oil from the emulsion is effected by thermally dehydrating the emulsion to remove water and applying specific gravity separation to the dehydrated oil to divide the oil into portions having a high and a low solids concentration to permit processing of each portion separately.

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and has an API gravity of about 8.0. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling, to recover an emulsion, or froth, which contains some of the fines and quantities of coarse sand. Such an emulsion or froth is referred to herein as a bituminous emulsion.

Although the bituminous emulsion employed as the feedstock of this invention is not dependent on any particular technique in the water extraction of bituminous sand, one well-known method for preparing such emulsions is often referred to as the "hot-water process." In the hot-water process, the bituminous sand is slurried with steam and hot water at about 180° F. and the pulp is then agitated with a stream of circulating hot water and carried to a separation cell maintained at an elevated temperature of about 180° F. In the separation cell, entrained air causes the bitumen to rise to the top of the cell in the form of a froth. The froth contains air with the emulsion of bitumen, water and mineral solids. The mineral solids are extremely difficult to separate from the bitumen and, unless the emulsion is further treated, it will generally contain at least 3% of mineral solids. This bituminous emulsion or froth can then be subjected to froth washing to effect a partial reduction in solids.

The bituminous emulsion, such as that obtained by the above-described procedures, often contains from about 10% to about 60% water, 3% to about 20% of mineral solids and from about 30% to about 85% bitumen. Usually, however, the bituminous emulsion or froth will contain, by weight, from about 25% to about 50% water, about 4% to about 12% mineral solids and about 35% to about 70% of bitumen.

Separation of water and mineral solids from the bituminous emulsion is necessary for most ultimate uses of the bitumen. However, the separation of water and mineral solids from the emulsion is difficult.

A number of methods have been proposed for breaking bituminous emulsions and recovering the bitumen. However, these generally suffer from various shortcomings such as incomplete separation or high cost. Such prior art methods include the following procedures or combinations thereof:

(a) Gravity settling of solids and water after dilution with light solvent;
(b) Gravity settling as in (a) but with elevated temperature and pressure;
(c) Gravity settling as in (a) or (b) but with addition of chemicals to reduce the interfacial tension of the system; and
(d) Electrostatic treatment after dilution with light solvent.

The bitumen from tar sand is generally of low API gravity, i.e. about 8.0°, and contains relatively little material boiling in the distillate boiling range. In addition, the oil (bitumen) has a high content of organic sulphur and organic nitrogen compounds. Extensive processing is necessary to remove nitrogen and sulphur and to obtain high yields of commercially desirable products from such crude oil.

It is an object of this invention to provide a process for recovering oil from bituminous emulsions and particularly from such emulsions which are in the form of a froth.

A further object of this invention includes a process for separating a mixture of bitumen and mineral solids from a common source into streams having different compositions and either treating each stream differently or recovering different products therefrom in an economical and effective fashion.

Other objects and advantages of this invention will become apparent to those skilled in the art as the description thereof proceeds.

Briefly, the process of this invention comprises thermally dehydrating the bituminous emulsion under elevated temperature and pressure, dividing the dehydrated emulsion by specific gravity separation into a first fraction having a high mineral solids concentration and a second fraction having a concentration of mineral solids substantially less than the first fraction, and separately treating each fraction to recover a hydrocarbon product substantially free of mineral solids and a residue. The reaction conditions, the hydrocarbon products, or the residue, differ for each of the separate streams which are treated.

The dehydration temperature and pressure can vary over wide ranges such as temperatures of from about 225° F. to about 550° F. and pressures from about 4 p.s.i.g. to about 1000 p.s.i.g. Preferably, the temperature can be from about 350° F. to about 450° F. and the pressure from about 100 p.s.i.g. to about 300 p.s.i.g. The dehydrated emulsion can contain from zero to about 5% water and preferably from 0% to about 2% water. Additionally, the dehydrated emulsion contains from about 5% to about 40% solids; these values generally being from about 5% to about 25% solids and from about 79% to about 94% bitumen. The dehydrator can be any suitable vessel for separating the vaporized water from the emulsion under the specified temperatures and pressures. The heat removed from the dehydrator in the vapour overhead is utilized by direct use of the stream in the extraction process, or to produce clean steam by using heat exchangers. In this regard the dehydrator conditions of pressure and temperature can be set, within the limits specified above, so as to produce steam of high enough temperature and pressure to be suitable for use elsewhere.

After dehydration, the mixture of bitumen, mineral solids and small quantities of water is subjected to specific gravity separation to divide the mixture into a portion having a high solids concentration and a portion having a solids concentration substantially less than the first portion. Since the mineral solids contain large amounts of fines, it is extremely difficult to make a good specific gravity separation between oil and solids. Preferably, for the purpose of this invention the concentration of mineral solids of the separated streams or portions of the dehydrated emulsion is at least 10% higher in the high-solids portion as compared to the low-solids portion and it is particularly desirable that the difference in concentrations of mineral solids in the different portions be at least 20%. Thus, with a minimum differential of 10% solids, one portion of the dehydrated mixture can contain from about 35% to 70% solids, about 29% to 64% bitumen, and no more than about 4% water; whereas, the second can contain from about 1% to 10% solids, about 97% to 89% bitumen and no more than about 4% water. In the specific gravity separation a larger concentration of water will be found in the portion having the lower solids concentration. The specific gravity separation of the dehydrated mixture is preferably effected at elevated temperatures such as those of from about 300° F. to about 700° F. and preferably from about 400° F. to about 700° F., so that the bitumen viscosity is greatly reduced.

The term "specific gravity separation" as used herein, is intended to encompass settling as well as other procedures wherein centrifugal force is utilized such as centrifuging or cycloning. Cycloning is a preferred method for achieving specific gravity separation in the dehydrated mixture of bitumen and mineral solids in order to effect the desired separation. In cycloning the dehydrated mixture, conventional hydrocyclones and procedures can be employed. Two-stake cycloning can be employed when it is desirable to do so; such as when the mineral solids in the dehydrated mixture encompass a large range of particle size. Two-stage cycloning is accomplished by first feeding the dehydrated mixture into a large-diameter cyclone, or cyclones operating in parallel. The ensuing centrifugal force applied to the mixture in the cyclone(s) causes a small portion thereof, containing a relatively high concentration of mineral solids, to underflow from the cyclone(s). The mineral solids in the underflow are primarily from the larger-sized mineral particles in the feed. The remainder of the mixture, comprising the bulk of the fluid in the mixture and a relatively low concentration of mineral solids, overflows from the cyclone(s). The overflow from the large-diameter cyclone(s) is fed into smaller-diameter cyclones operating in parallel. This feed is separated into overflow and underflow streams which exit from the cyclones. The underflow stream comprises a relatively small portion of the feed, but it contains a relatively high concentration of mineral solids. The overflow from the small-diameter cyclones contains the bulk of the hydrocarbon in the feed stream to the large-diameter cyclone, but much of the mineral solids contained in the feed stream have been removed in the underflow streams effluing from the large and small-diameter cyclones. The streams underflowing the smaller-diameter cyclones and larger-diameter cyclone(s) are combined and processed to recover the hydrocarbon value present therein.

As mentioned hereinbefore, the underflow and overflow streams from the gravity separation are processed separately. Since the separate streams contain different concentrations of bitumen and mineral solids, the processing equipment can be operated to give maximum yields of desirable hydrocarbon products with least amount of wastage due to the differences in feedstock compositions. In the case of the cyclone overflow stream, the solids concentration is generally sufficiently low to permit it to be processed directly by any of several conventional methods, such as delayed coking, fluid coking, thermal visbreaking and hydrogenation, into a material which can readily be refined to produce marketable hydrocarbon products. However, the large amount of solids in the underflow stream necessitates the use of special processing in order that the hydrocarbon contained therein can be utilized.

The pressure used for the thermal dehydration operation is generally sufficiently great that the dehydrated bitumen will flow without pumping through the furnace and the cyclones. This is particularly desirable as the solids concentration increases. Also, the heat that is added to the bitumen in the furnace prior to cycloning is largely recovered as pre-heat needed in the cyclone overflow bitumen stream going to the conventional refining unit. Both of these features add to the attractiveness of this approach for bituminous emulsion treating.

Referring now more particularly to the drawing, a stream of 1695 pounds per hour of bituminous emulsion froth is introduced through a conduit 1. This froth is obtained from treatment of bituminous sands in a hot-water process and has been subjected to water-washing to reduce solids content. Froth in conduit 1 contains 60.3% bitumen (1021 lbs./hr.), 34.3% water (581 lbs./hr.) and 5.5% mineral solids (93 lbs./hr.), and is charged into a dehydrator 2 which is maintained at a temperature of 400° F. and a pressure of 235 p.s.i.g. Water in the emulsion and small quantities of lighter hydrocarbon vaporize and escape overhead through a conduit 3 for passage into a steam boiler 4 where they are condensed, and the heat of condensation released is used to produce steam, which is recovered through a conduit 5 and used elsewhere. Feed water is introduced to the boiler 4 through a conduit 6 and condensate is removed through a conduit 7. The dehydrator bottoms comprising 90.6% bitumen (995 lbs./hr.), 1.0% water (11 lbs./hr.) and 8.4% mineral solids (93 lbs./hr.), pass out of the dehydrator through a conduit 8 which forces the bottoms through a furnace 9, wherein the temperature of the bottoms is raised to 700° F. At this point there is sufficient back-pressure from the dehydrator to force the 700° F. bottoms through a system of cyclones, wherein the separation of bitumen into a low-solids stream and a high-solids stream is effected. The overflow from the larger cyclone 11 can be fed into a bank of smaller cyclones 12, through conduits 13 if a suitable separation of solids and bitumen is not realized in the larger cyclone. The final cyclone overflow stream is composed of 95.8% bitumen (915 lbs./hr.), 1.0% water (10 lbs./hr.) and 3.2% solids (30 lbs./hr.) and is passed through a conduit 14 to a conventional refining unit. The cyclone bottoms, composed of 55.4% bitumen (80 lbs./hr.), 0.7% water (1 lb./hr.) and 43.9% solids (63 lbs./hr.), pass through a conduit 16 to a cyclone underflow refining unit.

From the above figures it can be seen that the major portion of the hydrocarbon is in the overflow stream which passes into the conventional refining unit, whereas the bulk of the solids is present in the relatively small underflow stream, which goes into a special high-solids refining unit. If warranted by subsequent processing, it is possible to effect a greater removal of solids, leaving less solids in the cyclone overflow stream, by using smaller second-stage cyclones, by using a higher pressure drop, or by adding a third stage of cyclones.

The high-solids refining unit is specially designed to handle the high concentration of solids in this cyclone underflow stream. The high-solids refining unit can be, for instance, a fluid coking unit especially designed for this feedstream. In this case, the net coke product would contain so much solids that it would be disposed of as a waste product rather than being utilized as an article of commerce such as a fuel. Another method for recovering the hydrocarbon value from this cyclone underflow stream is by cooling and diluting the stream with a lighter hydrocarbon and filtering the resultant mixture. Filtration is effective on the cyclone underflow stream because most of the finest solids, which would tend to plug the filter medium, are left in the cyclone overflow stream. The lighter hydrocarbon is used as diluent to reduce the viscosity of the stream and additional quantities are used as a wash medium for the deposited filter cake. The lighter hydrocarbon is then recovered from the filter cakes by steaming. Heavy and intermediate boiling range naphthas are examples of lighter hydrocarbons which might be used. The mixture of lighter hydrocarbon and bitumen recovered by the filtration step can then be charged to the conventional refining unit along with the low-solids content cyclone overflow stream. Alternately, the filtrate stream can be distilled to remove the lighter hydrocarbon so that only the bitumen is charged to the conventional refining unit.

We claim:
1. A process for removing water and mineral solids from a bituminous emulsion and recovering a hydrocarbon product which comprises:
 (a) feeding into a dehydration zone a bituminous froth comprising from about 10% to about 60% water, from about 30% to about 85% bitumen having a specific gravity from about 1.0 to about 1.05 and from about 3% to about 20% of mineral solid, said dehydration zone being maintained at a temperature of from about 225° F. to about 550° F. and a pressure of from about 4 p.s.i.g. to about 1000 p.s.i.g.;
 (b) removing water from said froth in the dehydration zone and recovering a dehydrated stream comprising a mixture of mineral solids, bitumen and from zero to about 5% water;
 (c) passing said dehydrated stream through a hydrocyclone and separating the dehydrated mixture into a high and a low mineral solids stream, said low mineral solids stream containing a major portion of the dehydrated bitumen fed into the cyclone;
 (d) diluting said high mineral solids stream with a lighter hydrocarbon and passing through a filtration unit to remove the bulk of the solids; and
 (e) combining the filtrate hydrocarbon from step (d) with the low mineral solids stream and processing the combined streams in a hydrocarbon refining unit to produce hydrocarbon product having higher API gravity than said bitumen.

2. A process for removing water and mineral solids from a bituminous emulsion and recovering a hydrocarbon product which comprises:
 (a) thermally dehydrating at a temperature of from about 225° F. to about 550° F. and a pressure of from about 4 p.s.i.g. to 1000 p.s.i.g., a bituminous emulsion comprising from about 10% to about 60% water, from about 30% to about 85% of bitumen having a specific gravity of from about 1.0 to about 1.05, and from about 3% to about 20% of mineral solids;
 (b) recovering a dehydrated mixture from said dehydration zone comprising from about 79% to about 94% of bitumen, from zero to about 5% water and about 5% to about 40% of mineral solids;
 (c) passing said dehydrated mixture through a hydrocyclone and separating the mixture into a high mineral solids stream and a low mineral solids stream, said low solids stream comprising 97% to 89% of bitumen, and 1% to 10% of mineral solids and up to about 4% of water, said high solids stream comprising from about 29% to 64% of bitumen, from 35% to 70% solids and up to about 4% water;
 (d) diluting said high solids stream with a lighter hydrocarbon and passing through a filtration unit to remove the bulk of the solids contained in said stream;
 (e) combining the filtrate realized from filtration of said high solids stream in (d) above with said low solids stream; and
 (f) processing the combined streams in a hydrocarbon refining unit which transforms said combined streams into a higher API gravity hydrocarbon fluid and a separate residue which contains essentially all of the solids contained in said combined streams.

References Cited
UNITED STATES PATENTS

| | | | |
|---|---|---|---|
| 2,910,424 | 10/1959 | Tek et al. | 208—11 |
| 2,968,603 | 1/1961 | Coulson | 208—11 |
| 3,117,922 | 1/1964 | Leary et al. | 208—11 |

FOREIGN PATENTS

| | | |
|---|---|---|
| 602,087 | 7/1960 | Canada. |

OTHER REFERENCES

Research Council of Alberta, Report No. 58 by D. S. Pasternack and K. A. Clark, Univ. of Alberta, Edmonton, Alberta, Canada (p. 10 relied on).

DANIEL E. WYMAN, *Primary Examiner.*

P. E. KONOPKA, *Assistant Examiner.*

UNITED STATES PATENT OFFICE
CERTIFICATE OF CORRECTION

Patent No. 3,338,814                      August 29, 1967

Richard A. Given et al.

It is hereby certified that error appears in the above numbered patent requiring correction and that the said Letters Patent should read as corrected below.

In the heading to the printed specification, line 5, beginning with "assignors, by mesne assignments," strike out all to and including "a corporation of Canada" in line 9, and insert instead -- assignors, by direct and mesne assignments, of thirty percent to Cities Service Athabasca, Inc., Edmonton, Alberta, Canada, a corporation of Delaware, thirty percent to Imperial Oil Limited, a corporation of Canada, thirty percent to Atlantic Richfield Company, a corporation of Pennsylvania and ten percent to Royalite Oil Company, Limited, a corporation of Canada --.

Signed and sealed this 10th day of September 1968.

(SEAL)
Attest:

Edward M. Fletcher, Jr.                      EDWARD J. BRENNER
Attesting Officer                            Commissioner of Patents